United States Patent
Smith et al.

(10) Patent No.: US 7,283,784 B2
(45) Date of Patent: Oct. 16, 2007

(54) BROADCAST DATA RECEIVER APPARATUS AND METHOD FOR CONTROLLING POWER SUPPLY

(75) Inventors: Mark Smith, Steeton (GB); Philip Yates, Bradford (GB); Colin Faulkner, Colne (GB)

(73) Assignee: Pace Micro Technology Plc, Saltaire, Shipley (GB)

( * ) Notice: Subject to any disclaimer, the term of this patent is extended or adjusted under 35 U.S.C. 154(b) by 980 days.

(21) Appl. No.: 10/103,093

(22) Filed: Mar. 21, 2002

(65) Prior Publication Data
US 2002/0137483 A1    Sep. 26, 2002

(30) Foreign Application Priority Data
Mar. 21, 2001  (GB) .................... 0107045.7

(51) Int. Cl.
H01Q 11/12    (2006.01)
H04H 1/00     (2006.01)

(52) U.S. Cl. ............... 455/3.02; 455/3.05; 455/127.11; 455/522

(58) Field of Classification Search ............... 455/3.02, 455/3.05, 127.11, 522, 3.01, 3.04, 129–132, 455/127.1, 127.2, 69, 136; 343/703
See application file for complete search history.

(56) References Cited

U.S. PATENT DOCUMENTS

| | | | |
|---|---|---|---|
| 5,134,486 A * | 7/1992 | Suzuki et al. ................ 725/71 |
| 5,432,501 A * | 7/1995 | Yoon ........................... 340/650 |
| 5,578,916 A * | 11/1996 | Muterspaugh ............... 323/267 |
| 5,724,645 A * | 3/1998 | Na ............................. 455/3.02 |
| 6,134,282 A * | 10/2000 | Ben-Efraim et al. ........ 375/350 |
| 6,178,447 B1 * | 1/2001 | Wannenmacher et al. .. 709/219 |
| 6,600,730 B1 * | 7/2003 | Davis et al. ................. 370/343 |
| 6,728,513 B1 * | 4/2004 | Nishina ..................... 455/3.02 |
| 6,771,930 B2 * | 8/2004 | Buer ......................... 455/13.4 |
| 6,832,071 B1 * | 12/2004 | Nakamura et al. ......... 455/3.02 |
| 2002/0044094 A1 * | 4/2002 | May .......................... 343/703 |
| 2004/0192190 A1 * | 9/2004 | Motoyama ................. 455/3.02 |

FOREIGN PATENT DOCUMENTS

EP    0 511 819 A1    4/1992

OTHER PUBLICATIONS

Japanese Abstract of Publication No. 08016260, Date Jan. 19, 1996, Hitachi Ltd.
Japanese Abstract of Publication No. 09327123, Date Dec. 16, 1997, Fujitsu General Ltd.

* cited by examiner

Primary Examiner—Edan Orgad
(74) Attorney, Agent, or Firm—Head, Johnson & Kachigian

(57) ABSTRACT

Broadcast data receiver apparatus is provided. The apparatus includes a broadcast data receiver (BDR) connected to at least one LNB. The BDR provides a power supply to allow operation of the LNB. At least two analogue to digital converter sampling points are provided to allow the input and output voltages to be measured at the LNB, thereby allowing the voltage drop across a linear regulator (8) of the LNB to be assessed. Control means are provided to control the power supply from the BDR to the LNB in response to the voltage measurements obtained.

16 Claims, 1 Drawing Sheet

BROADCAST DATA RECEIVER APPARATUS AND METHOD FOR CONTROLLING POWER SUPPLY

CROSS-REFERENCE TO RELATED APPLICATION

This application claims priority to British Patent Application No. 0107045.7 filed 21 Mar. 2001.

BACKGROUND OF THE INVENTION

The invention which is the subject of this application relates to broadcast data receiver apparatus for the control and provision of power supply to components of a broadcast data receiving system which utilizes a Low Noise Block (LNB) either singly, or in combination, as part of the data receiving apparatus.

Typically, broadcast data receiving apparatus incorporates a means for receiving data which is broadcast from a remote location (the head end) to a number of locations, each equipped with the apparatus. In one system, the data is broadcast via a satellite transmission system whereby the data is received at a number of premises, each equipped with an antenna which includes at least one LNB for the reception of data carried at certain frequencies. When received by the LNB, the data passes to a Broadcast data receiver (BDR) mounted within the premises which is provided with the means to decode and process the data to allow the generation of video, audio and or other services, typically via a television set to which the BDR is connected or may be provided as part of the television set.

At the present time, the BDR is required to be able to supply sufficient power to the LNB or LNB'S to allow the same to be operable. Typically, conventional LNB power supplies with the BDR are required to be able to generate two distinct output voltages, normally 13 volts and 18 volts. However due to power dissipation which occurs, the actual levels which are required to be generated are normally two unregulated power rails of 16 volts and 20 volts respectively. Indeed at relatively extreme loads such as 400 mA, there can be up to 1.2 Watts of power dissipation in the regulator for the LNB. This is typically dissipated in the form of heat and so it will be appreciated that at the present time the design of power supply which is used means that the unregulated power supply rails need to be sufficiently high in order to guarantee enough power capacity with extreme loads on other power supply rails.

SUMMARY OF THE INVENTION

The aim of the present invention is to provide broadcast data receiver apparatus for providing a power supply to an LNB in a manner which allows the required power supply tolerances to be reduced whilst ensuring that the apparatus can cope with variations in the power supply required.

In a first aspect of the invention there is provided broadcast data receiving apparatus, said apparatus including a Broadcast data receiver (BDR) connected to at least one LNB, said BDR providing a power supply to allow operation of said LNB, characterized in that the voltage drop across a linear regulator of the LNB is assessed, and control means are provided to control the power supply from the BDR to the LNB in response to said voltage measurements drop value.

In one embodiment at least two analogue to digital converter (ADC) sampling points are provided to allow the input and output voltage values to be measured at the LNB, thereby allowing the voltage drop to be assessed.

Typically the power supply is controlled so as to minimize the voltage drop and hence improve efficiency of operation.

In one embodiment a microcontroller is provided which allows the control of a voltage switcher in order to reduce power supply rail usage and hence power consumption by controlling the power supply in such a way as to maintain a minimum voltage drop across the linear regulator required for generation of the LNB voltage.

Typically a step up voltage switcher is used and the monitoring of the input and output voltages means that a voltage drop of a predesignated value or limit can be set in the microcontroller and the same controls the power supply so that minimum voltage drop can be maintained across the linear regulator. This means that the overall STB power consumption is kept to a minimum, and the number of voltage rails required within the STB is reduced.

In a further aspect of the invention there is provided a method for controlling the power supply from a Broadcast data receiver (BDR) to at least one Low Noise Block (LNB) connected thereto, said BDR providing a power supply to allow operation of said LNB, characterized in that the method includes the steps of measuring the voltage at at least two analogue to digital converter sampling points, calculating the voltage drop across a linear regulator (8) of the LNB and controlling the power supply from the BDR to the LNB in response to said voltage measurements obtained.

BRIEF DESCRIPTION OF THE DRAWING

A specific embodiment of the invention is now described with reference to the accompanying drawings wherein.

DESCRIPTION OF THE PREFERRED EMBODIMENTS

Figure 1:
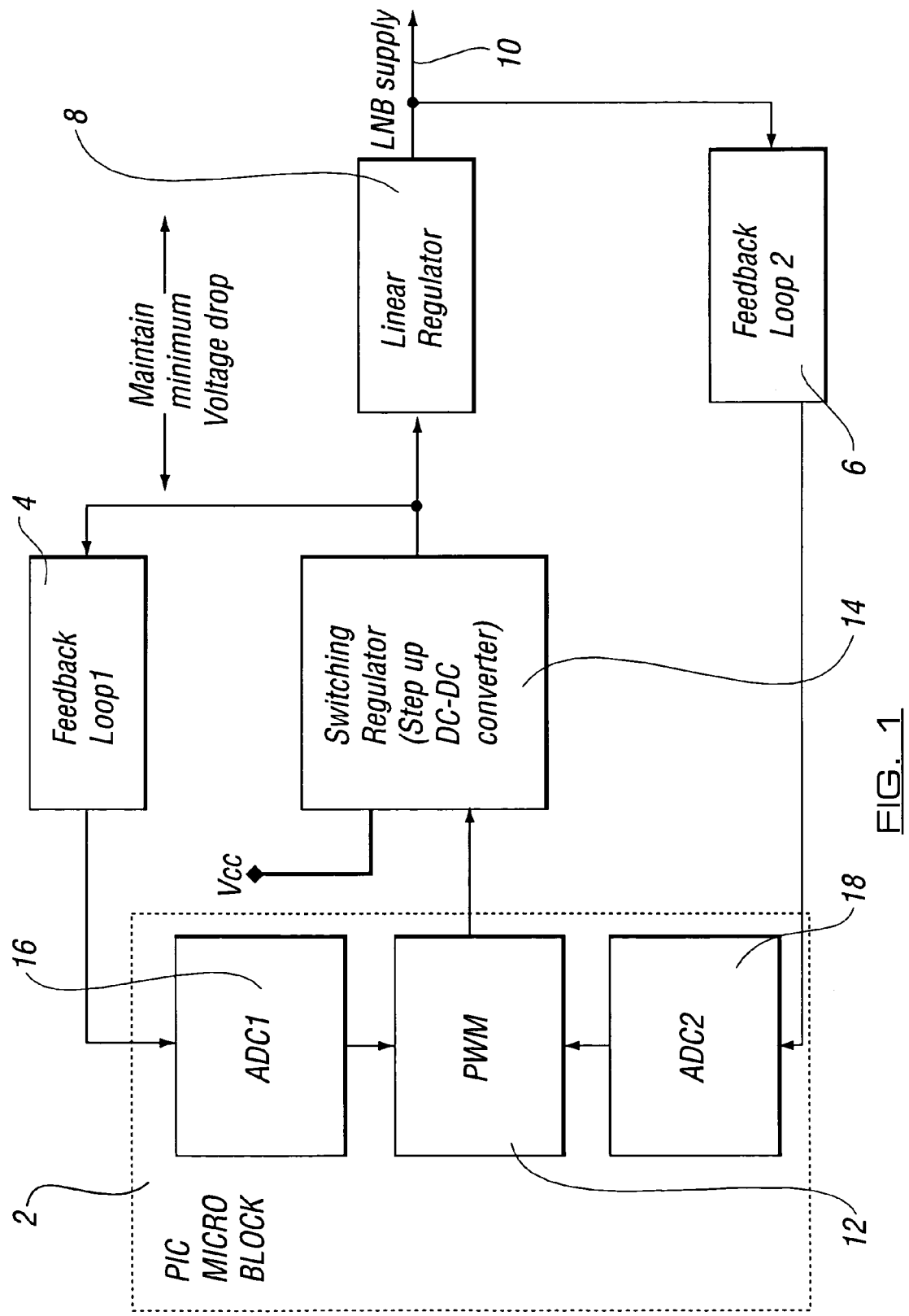
FIG. 1 illustrates a block diagram of one configuration of the invention.

Referring now to FIG. 1 there is shown a programmable microcontroller block (PIC) microblock 2 which receives data from first and second feedback loops 4, 6 respectively in order to maintain minimum voltage drop at the linear regulator 8 to the LNB supply 10.

In accordance with the invention, a relatively low voltage rail within a BDR can be used to generate the necessary voltages required to operate an LNB.

By closely monitoring the voltage, minimum dissipation within the LNB regulator circuit can be obtained so that the BDR uses less power and dissipates less heat. By using a single voltage rail to generate the voltage, rather than a double or a number of voltage rails arrangement as is conventionally the case, up to two voltage rails can be saved from the power supply in the BDR. The saved voltage rails can be removed to save money or alternatively they can be used to generate lower core voltages such as 2.1v or 1.8v which can also increase overall efficiency and save power within the BDR.

In monitoring of the voltage, the micro controller generates a modulating pulse source (MPS) such as Pulse Position Modulation (PPM) or as described in this embodiment pulse width modulation (PWM variable duty cycle square waveform) 12 with switching occurring, for example, at 100 KHz. This waveform is used to drive a switching regulator 14 used to do DC-DC conversion (step down). A step up or step down configuration may be used.

The resulting voltage is fed back into an ADC 16 within the microcontroller. This is then converted to a digital value which can then be used to increase or decrease the duty cycle load on the PWM. When the load is increased, the output voltage is caused to drop and the analogue value from the ADC is reduced. This in turn leads to the software increasing the duty cycle until the desired voltage is achieved.

A number of safety provisions can be provided to prevent failure of the system and these can include the following. A slow ramp up of PWM during switching from off to an on condition or vertical to horizontal polarity, will ensure that a large amount of current is not drawn instantaneously from the power supply thus reducing high current transients. If no feedback is received from the ADC, in order to safeguard against fault conditions the PWM will turn off and may indicate a short circuit condition. Similarly, if the output voltage exceeds the maximum level set the PWM will switch off, thereby allowing the voltage to decay until it reaches a more desirable level. To prevent over current through the switcher, a maximum duty cycle is set within the software so that under no circumstances can the switcher operate outside its normal acceptable range. In addition to this a hardware current monitor is integrated into the linear regulator to actively shut down the LNB supply during fault conditions.

The output voltage after the linear regulator is monitored by a second ADC 18. This allows the switcher to always maintain the minimum drop out voltage across the regulator and reduce dissipation. If the voltage drop across the linear regulator becomes too high then it can be assumed that the linear regulator has reached its current limit and is therefore limiting the output voltage. When this point is reached the switcher and linear regulator can be switched off and back on at regular intervals with close monitoring of the fault condition until the fault is removed.

It is preferable that the microcontroller includes the following functions to control the switcher in the appropriate manner;

1. Modulating Pulse Source (PWM) capture port, which is a pin on the microcontroller that outputs a series of pulses such as to control the output voltage from DC to DC converter.

2. Analogue to digital converters.

While there are alternatives to these particular features, it is found that further hardware and cost is involved. Many microcontrollers currently available include the desired features to allow the same to be used.

Thus, in accordance with the invention, a low voltage rail within the BDR can be used to generate the necessary voltages required to operate the same. The close monitoring of this voltage allows for minimum dissipation within the LNB regulator circuit and therefore the BDR uses less power and dissipates less heat. By using a single rail to generate this voltage, a number of voltage rails currently required can be saved from the power supply. This can be used to save money or to generate lower voltage core voltages. This can again increase overall efficiency and save power within the BDR whilst ensuring that the voltage drop across the linear regulator is kept at a low value.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A broadcast data receiving apparatus, said apparatus comprising:
    a broadcast data receiver connected to at least one low noise block and providing a power supply to said low noise block having a linear regulator and to assess voltage values at the linear regulator; and
    control means being provided to control the power supply from said broadcast data receiver and to minimize assessed voltage drops across the linear regulator and having a micro-controller for controlling a voltage switcher and wherein said micro-controller generates a modulating pulse source waveform to control said voltage switcher.

2. A broadcast data receiver apparatus according to claim 1 wherein one or more pre-determined voltage drops may be set in said micro-controller for controlling said voltage switcher.

3. A broadcast data receiver apparatus according to claim 1 wherein a step up voltage switcher is used.

4. A broadcast data receiver apparatus according to claim 1 wherein a step down voltage switcher is used.

5. A broadcast data receiver apparatus according to claim 1 wherein slow ramp up of said modulating pulse source is provided during switching of said voltage switcher from an on to an off condition and/or from vertical to horizontal polarity.

6. A broadcast data receiver apparatus according to claim 1 wherein said modulating pulse source switches off if no voltage measurements are received via an analogue to digital convertor.

7. A broadcast data receiver apparatus according to claim 6 wherein a visual and/or audio indication means is provided to indicate said modulating pulse source switching off.

8. A broadcast data receiver apparatus according to claim 1 wherein hardware current monitoring means are provided in said linear regulator to shut down said low noise block supply during a detected faulty condition.

9. A broadcast data receiver apparatus according to claim 1 wherein two analogue to digital converters are provided for receiving voltage data from two feedback loops.

10. A broadcast data receiver apparatus according to claim 9 wherein one of said two analogue to digital converters receives voltage feedback data from said voltage switcher and the other analogue to digital converter receives voltage feedback from across said linear regulator of said low noise block.

11. A broadcast data receiver apparatus according to claim 1 wherein one voltage rail is provided to generate the voltage from said broadcast data receiver to said low noise block.

12. A broadcast data receiver apparatus according to claim 1 wherein at least two analogue to digital converter sampling points are provided to allow input and output voltage values to be measured at said low noise block, thereby allowing the voltage drop to be assessed with respect to the measurements obtained.

13. A method for controlling the power supply from a broadcast data receiver to at least one low noise block connected thereto, said method comprising the steps of:
    providing a power supply from said broadcast data receiver to allow operation of said low noise block;
    measuring the voltage at at least two analogue to digital converter sampling points;
    calculating a voltage drop across a linear regulator of said low noise block; and controlling the power supply from said broadcast data receiver to said low noise block in response to said voltage measurements obtained by generating a modulating pulse source waveform for controlling a voltage switcher; and providing slow ramp up of said modulating pulse source during switching of said voltage switcher from an on to an off condition and/or from vertical to horizontal polarity.

14. A broadcast data receiving apparatus, said apparatus comprising:

a broadcast data receiver connected to at least one low noise block and providing a power supply to said low noise block having a linear regulator and to assess voltage values at the linear regulator; and control means being provided to control the power supply from said broadcast data receiver and having a micro-controller for generating a modulating pulse source wave form for controlling a voltage switcher to minimize the assessed voltage drops across the linear regulator; and slow ramp up of said modulating pulse source being provided during switching of said voltage switcher from an on to an off condition and/or from vertical to horizontal polarity.

15. A broadcast data receiver according to claim 14 wherein one or more pre-determined voltage drops may be set in said micro-controller for controlling said voltage switcher.

16. A broadcast data receiver according to claim 14 wherein a step up and/or step down voltage switcher is used.

* * * * *